United States Patent
Adachi

(10) Patent No.: US 7,835,475 B2
(45) Date of Patent: Nov. 16, 2010

(54) DIGITAL BROADCAST RECEIVER, MOBILE TERMINAL AND CHANNEL SEARCH METHOD

(75) Inventor: Naoto Adachi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 956 days.

(21) Appl. No.: 11/553,144

(22) Filed: Oct. 26, 2006

(65) Prior Publication Data

US 2007/0274405 A1    Nov. 29, 2007

(30) Foreign Application Priority Data

May 29, 2006 (JP) ............... 2006-148291

(51) Int. Cl.
*H03D 1/00* (2006.01)
*H04N 11/02* (2006.01)

(52) U.S. Cl. .............................. 375/343; 375/240.28

(58) Field of Classification Search ........... 375/316, 375/322, 324, 326, 329, 33, 331, 343, 130, 375/132, 136, 137, 147, 150, 226, 230, 232, 375/240, 240.01, 240.08, 240.1, 240.11, 375/240.18, 240.26, 240.28, 333, 325, 332; 370/203, 210; 455/3.01, 3.02

See application file for complete search history.

(56) References Cited

U.S. PATENT DOCUMENTS

| 5,960,030 A * | 9/1999 | Maruyama ............... 375/150 |
| 6,111,919 A * | 8/2000 | Yonge, III ............... 375/260 |
| 6,341,123 B1* | 1/2002 | Tsujishita et al. ......... 370/210 |
| 2002/0003773 A1* | 1/2002 | Okada et al. ............. 370/208 |
| 2002/0061076 A1* | 5/2002 | Seki et al. ............... 375/316 |

FOREIGN PATENT DOCUMENTS

| JP | 2003-110536 | 4/2003 |
| JP | 2005-333190 | 12/2005 |

* cited by examiner

*Primary Examiner*—David C Payne
*Assistant Examiner*—Vineeta S Panwalkar
(74) *Attorney, Agent, or Firm*—Fujitsu Patent Center

(57) ABSTRACT

A tuner selects a channel in a designated frequency band. An FFT circuit converts a received signal in the selected channel into a plurality of carrier signals. A carrier shift detection circuit calculates the correlation between the phase information of each carrier signal and reference phase information prepared in advance. If the correlation is larger than a given threshold, it is determined that an OFDM signal is present in the search target channel. A TMCC extraction circuit analyzes the TMCC of the received signal and determines whether or not digital broadcasts of the search target channel can be received.

7 Claims, 11 Drawing Sheets

F I G. 1 A
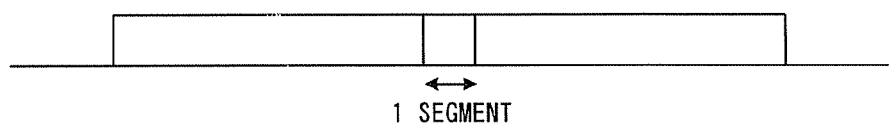
F I G. 1 B
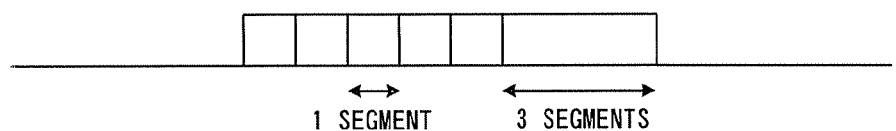

| CARRIER NUMBER / SYMBOL | 1 | 2 | 3 | 4 | ~ | 432 |
|---|---|---|---|---|---|---|
| 1 | $\theta_1$ | $\theta_2$ | $\theta_3$ | $\theta_4$ | | $\theta_{432}$ |
| 2 | $\theta_1$ | $\theta_2$ | $\theta_3$ | $\theta_4$ | | |
| 3 | $\theta_1$ | $\theta_2$ | $\theta_3$ | $\theta_4$ | | |
| ⟨ | | | | | | |
| 100 | $\theta_1$ | $\theta_2$ | $\theta_3$ | $\theta_4$ | | $\theta_{432}$ |

FIG. 7

| | AC CARRIER (CARRIER NUMBER) | TMCC CARRIER (CARRIER NUMBER) |
|---|---|---|
| MODE2 | 98,101,118,136 | 23,178 |
| MODE3 | 7、89、206、209、226、244、377、407 | 101,131,286,349 |

F I G. 8

| Bit | | CONTENT | | |
|---|---|---|---|---|
| 0 | 1 | STANDARD OF DIFFERENTIAL DEMODULATION | | |
| 1~16 | 15 | SYNCHRONIZATION SIGNAL | | |
| 17~19 | 3 | SEGMENT TYPE IDENTIFICATION | | |
| 20~21 | 2 | SYSTEM IDENTIFICATION | | |
| 22~25 | 4 | TRANSMISSION PARAMETER SWITCH INDICATOR | | |
| 26 | 1 | EMERGENCY WARNING BROADCAST START FLAG | | |
| 27 | 1 | CURRENT INFORMATION | | PARTIAL RECEIVING FLAG |
| 28~30 | 3 | | A | MODULATION TYPE |
| 31~33 | 3 | | A | CONVOLUTION CODING RATE |
| 34~36 | 3 | | A | INTERLEAVE LENGTH |
| 37~40 | 4 | | A | SEGMENT NUMBER |
| 41~43 | 3 | | B | MODULATION TYPE |
| 44~46 | 3 | | B | CONVOLUTION CODING RATE |
| 47~49 | 3 | | B | INTERLEAVE LENGTH |
| 50~53 | 4 | | B | SEGMENT NUMBER |
| 54~56 | 3 | | C | MODULATION TYPE |
| 57~59 | 3 | | C | CONVOLUTION CODING RATE |
| 60~62 | 3 | | C | INTERLEAVE LENGTH |
| 63~66 | 4 | | C | SEGMENT NUMBER |
| 67 | 1 | NEXT INFORMATION | | PARTIAL RECEIVING FLAG |
| 68~70 | 3 | | A | MODULATION TYPE |
| 71~73 | 3 | | A | CONVOLUTION CODING RATE |
| 74~76 | 3 | | A | INTERLEAVE LENGTH |
| 77~80 | 4 | | A | SEGMENT NUMBER |
| 81~83 | 3 | | B | MODULATION TYPE |
| 84~86 | 3 | | B | CONVOLUTION CODING RATE |
| 87~89 | 3 | | B | INTERLEAVE LENGTH |
| 90~93 | 4 | | B | SEGMENT NUMBER |
| 94~96 | 3 | | C | MODULATION TYPE |
| 97~99 | 3 | | C | CONVOLUTION CODING RATE |
| 100~102 | 3 | | C | INTERLEAVE LENGTH |
| 103~106 | 4 | | C | SEGMENT NUMBER |
| 107~109 | 3 | *LINKED TRANSMISSION PHASE CORRECTION AMOUNT | | |
| 107~121 | 15 | Reserve(All '1') | | |
| 122~203 | 82 | ERROR COPRRECTION PARITY | | |

*VALID IN TERRESTRIAL RADIO BROADCASTS

FIG. 9A

| | | |
|---|---|---|
| SEGMENT TYPE IDENTIFICATION | 000 | SYNCHRONOUS DEMODULATION |
| | 111 | DIFFERENTIAL DEMODULATION |
| SYSTEM IDENTIFICATION | 00 | DIGITAL TERRESTRIAL TV BROADCAST SYSTEM |
| | 01 | TETERRESTRIAL RADIO BROADCAST SYSTEM |
| | 1x | Reserve |
| TRANSMISSION PARAMETER SWITCH INDICATOR | 1111 | NORMAL VALUE |
| | 1110~0000 | PARAMETER SWITCHED AFTER (VALUE-1) |
| EMERGENCY WARNING BROADCASTING START FLAG | 0 | Disable |
| | 1 | Enabke |
| PARTIAL RECEIVING FLAG | 0 | Disable |
| | 1 | Enabke |
| MODULATION TYPE | 000 | DQPSK |
| | 001 | QPSK |
| | 010 | 16QAM |
| | 011 | 64QAM |
| | 100~110 | Reserve |
| | 111 | UNUSED HIERARCHY |
| CONVOLUTION CODING RATE | 000 | 1/2 |
| | 001 | 2/3 |
| | 010 | 3/4 |
| | 011 | 5/6 |
| | 100 | 7/8 |
| | 101~110 | Reserve |
| | 111 | UNUSED HIERARCHY |
| INTERLEAVE LENGTH | 000 | 0 |
| | 001 | 4(Mode1),2(Mode2),1(Mode3) |
| | 010 | 8(Mode1),4(Mode2),2(Mode3) |
| | 011 | 16(Mode1),8(Mode2),4(Mode3) |
| | ※101 | ※32(Mode1),16(Mode2),8(Mode3) |
| | 101~110 | Reserve |
| | 111 | UNUSED HIERARCHY |
| SEGMENT NUMBER | 0000 | Reserve |
| | 0001~1101 | VALUE INDICATES NUMBER OF SEGMENT |
| | 1110 | Reserve |
| | 1111 | UNUSED HIERARCHY |
| *LINKED TRANSMISSION PHASE CORRECTION AMOUNT | 000 | $-\pi/4$ |
| | 001 | $-2\pi/4$ |
| | 010 | $-3\pi/4$ |
| | 011 | $-4\pi/4$ |
| | 100 | $-5\pi/4$ |
| | 101 | $-6\pi/4$ |
| | 110 | $-7\pi/4$ |
| | 111 | 0 |

FIG. 9B

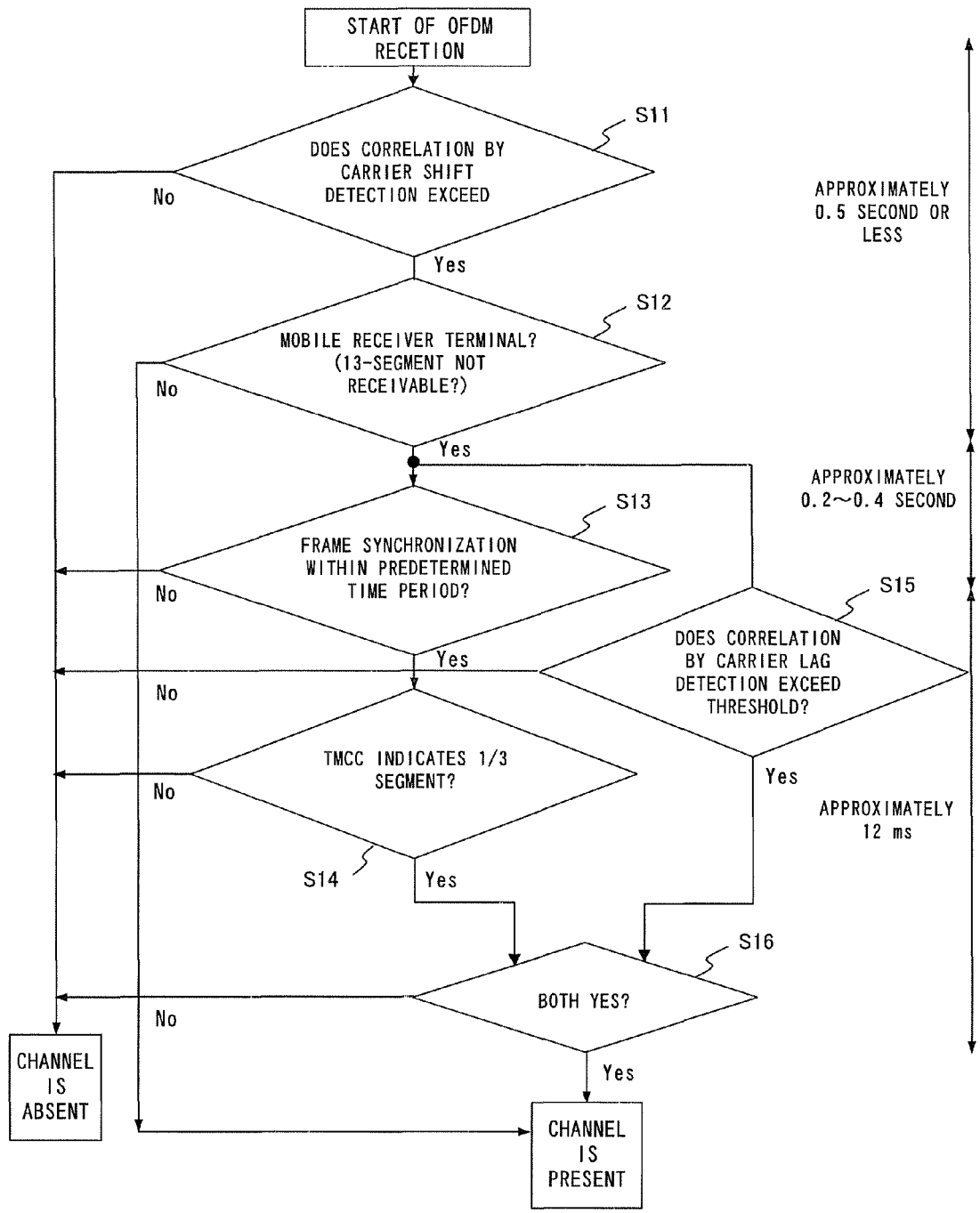
F I G. 1 0

DIGITAL BROADCAST RECEIVER, MOBILE TERMINAL AND CHANNEL SEARCH METHOD

CROSS REFERENCE TO RELATED APPLICATIONS

This application is based upon and claims the benefit of priority from the prior Japanese Patent Application No. 2006-148291, filed on May 29, 2006, the entire contents of which are incorporated herein by reference.

BACKGROUND OF THE INVENTION

1. Field of the Invention

The present invention relates to a digital broadcast receiver for receiving digital broadcast using OFDM, and particularly relates to a channel search method for digital terrestrial broadcasting.

2. Description of the Related Art

An Orthogonal Frequency Division Multiplexing (OFDM) has been proposed as a system for transmitting a digital signal in recent years. In the OFDM system, data is transmitted by making use of a plurality of carriers orthogonal to each other on the frequency domain. As a result, an OFDM transmitter modulates a transmission signal by utilizing Inverse Fast Fourier Transformation (IFFT), and an OFDM receiver demodulates the transmission signal by using Fast Fourier Transformation (FFT). Since OFDM is highly efficient in frequency usage, its application to digital terrestrial broadcasting has been widely explored. It should be noted that OFDM has been employed in ISDB-T (Integrated Services Digital Broadcasting-Terrestrial), which is a standard of digital terrestrial broadcasting in Japan.

Digital TV broadcasting employing the UHF band (channels 13-62) and digital radio broadcasting employing the VHF band (channels 7-8) are used for digital terrestrial broadcasting (ISDB-T) in Japan. In digital TV broadcasts, as shown in FIG. 1A, a 6 MHz band is assigned to each channel and the band is divided into 13 segments. High-definition broadcasts with 12 segments are sent to common television sets (fixed terminals), and broadcasts with the remaining one segment are sent to mobile terminals. Additionally, there are some channels that transmit broadcasts with 13 segments to fixed terminals. Note that in digital radio broadcasts, as shown in FIG. 1B, a 6 MHz band is divided into eight segments and broadcasts are sent using either one segment or three segments.

At present, only some of the above 50 channels (52 channels when digital radio is included) are actually used for digital broadcasting. Therefore, the digital broadcast receiver should comprise a function to search for channels being used for the digital broadcasting (or a function to search for available channels). In the following description, such a function is referred to as a channel search function.

It should be noted that when receiving digital terrestrial broadcasts with a mobile terminal, since the reception environment changes from hour to hour in accordance with the location of the mobile terminal, the terminal might not always be able to receive radio waves of the channel in which the digital broadcast is being transmitted. For that reason, the channel search function is particularly important in mobile terminals.

FIG. 2 is a flowchart showing an example of a channel search procedure in the related art. Note that processing in the flowchart is performed for each channel.

In step S101, whether the frame synchronization has been established or not is checked. The frame synchronization is detected by employing a synchronization signal in TMCC (Transmission and Multiplexing Configuration Control). When the frame synchronization is established, a bit error ratio (BER) is detected in step S102. If the bit error ratio is less than a prescribed threshold, it is determined that "the corresponding channel is being broadcast (or is receivable)". Meanwhile, when the frame synchronization is not established or the bit error ratio exceeds the threshold, it is determined that "the corresponding channel is not being broadcast (or is not receivable)". Note that a method employing the result of error correction sequence instead of detecting the bit error ratio is also proposed.

In Patent Document 1 (Japanese Patent Application Publication No. 2005-333190), a technology for obtaining program sequence information and for reducing the channel search time using the information is described. Patent Document 2 (Japanese Patent Application Publication No. 2003-110536), although it is not directly related to the channel search, describes a technology that speeds up the switching of broadcasts in terminals that can receive 1-segment broadcasts and 3-segment broadcasts.

The channel search procedure shown in FIG. 2 requires a time of approximately 0.7-1.0 second from the start of OFDM operation to the end of the frame synchronization check, and also requires approximately 0.5 second for monitoring the bit error ratio. If the procedure shown in FIG. 2 is performed on all channels in the UHF band (i.e. 50 channels), 1-2 minutes are required for a channel search. For that reason, users may feel frustrated or inconvenienced when conducting a channel search.

It should be noted that there is another possible method for reducing the channel search time: omit step S102. However, if the channel determination is performed solely on the basis of whether or not the frame synchronization has been established, statistically wrong determination results may be obtained (mainly the determination of "the corresponding channel is being broadcast" even though the corresponding channel is not being broadcast).

SUMMARY OF THE INVENTION

It is an object of the present invention to perform quick and highly accurate channel searches of digital broadcasts employing OFDM.

A digital broadcast receiver of the present invention is a receiver for receiving digital broadcasts employing OFDM. This receiver comprises a Fourier transformation circuit for performing a Fourier transformation of a received signal, a phase difference calculation unit for detecting the phase information of a plurality of carrier signals obtained by the Fourier transformation circuit, a correlation calculation unit for calculating the correlation value representing the correlation between the phase information detected by the phase difference calculation unit and prescribed phase information prepared in advance, and a determination unit for determining that an OFDM signal is present if the correlation value obtained by the correlation calculation unit is larger than a predetermined threshold.

When an OFDM signal in digital broadcasts is present in the search target channel, the correlation between phase information obtained by the phase difference calculation unit and the prescribed phase information prepared in advance becomes large. Therefore, a channel search function can be realized by calculating the correlation for each channel. According to this method, since the presence or absence of the OFDM signal is determined before establishment of the frame synchronization, the channel search time can be shortened.

When the OFDM signal of the digital broadcasts contains a data carrier signal, an AC carrier signal, and a TMCC carrier signal, the correlation calculation unit calculates a correlation value with respect to either the AC carrier signal, the TMCC carrier signal, or both. At that time, if the AC carrier signal and the TMCC carrier signal carry a DBPSK (Differential Binary Phase Shift Keying) modulated signal, the phase difference detection unit detects the phase difference between adjacent symbols as the phase information. The prescribed phase information prepared in advance is zero or $\pi$.

A mobile terminal of the present invention receives 1-segment and 3-segment digital broadcasts using OFDM. The mobile terminal comprises a Fourier transformation circuit for performing Fourier transformation of a received signal, a phase difference calculation unit for detecting the phase information of a plurality of carrier signals obtained by the Fourier transformation circuit, a correlation calculation unit for calculating the correlation value representing the correlation between the phase information detected by the phase difference calculation unit and prescribed phase information prepared in advance, a TMCC extraction circuit for detecting whether or not the received signal is a 13-segment broadcast signal on the basis of TMCC data contained in the received signal, and a determination unit for determining that an OFDM signal can be received if the correlation value obtained by the correlation calculation unit is larger than a predetermined threshold and the received signal is not a 13-segment broadcast signal.

According to this invention, the determination is made on the basis of the analysis of TMCC data (which is digital broadcast control information) in addition to being made using the correlation of phase information, and the accuracy in the channel search is therefore improved.

The present invention is to be able to perform quick and highly accurate channel searches of digital broadcasts that employ OFDM.

BRIEF DESCRIPTION OF THE DRAWINGS

FIGS. 1A and 1B are diagrams showing the band configuration of digital terrestrial broadcasting;

FIG. 7 is an implementation of the phase information memory;

FIG. 8 is a diagram showing an arrangement of the AC carrier and the TMCC carrier;

FIGS. 9A and 9B are diagrams showing the format of the TMCC data; and

FIG. 10 is a flowchart showing the implementation of the channel search method.

DESCRIPTION OF THE PREFERRED EMBODIMENTS

Figure 2:
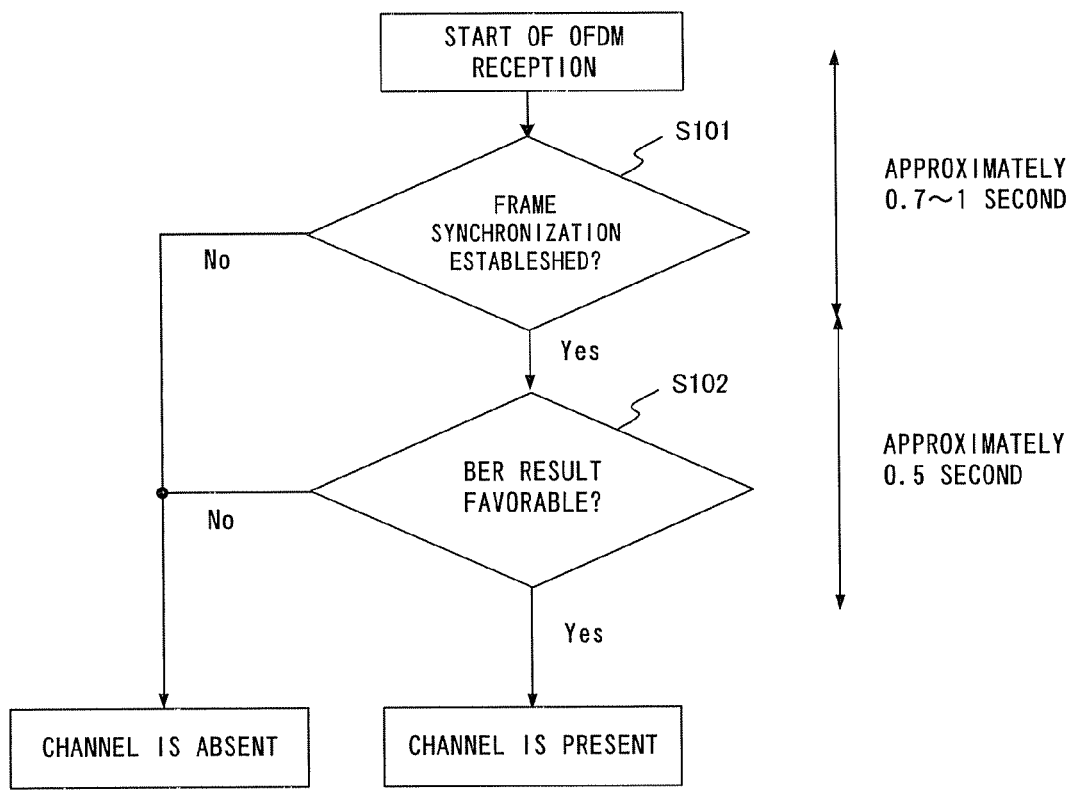
FIG. 2 is a flowchart showing an example of a channel search sequence in the related art.
Figure 3:
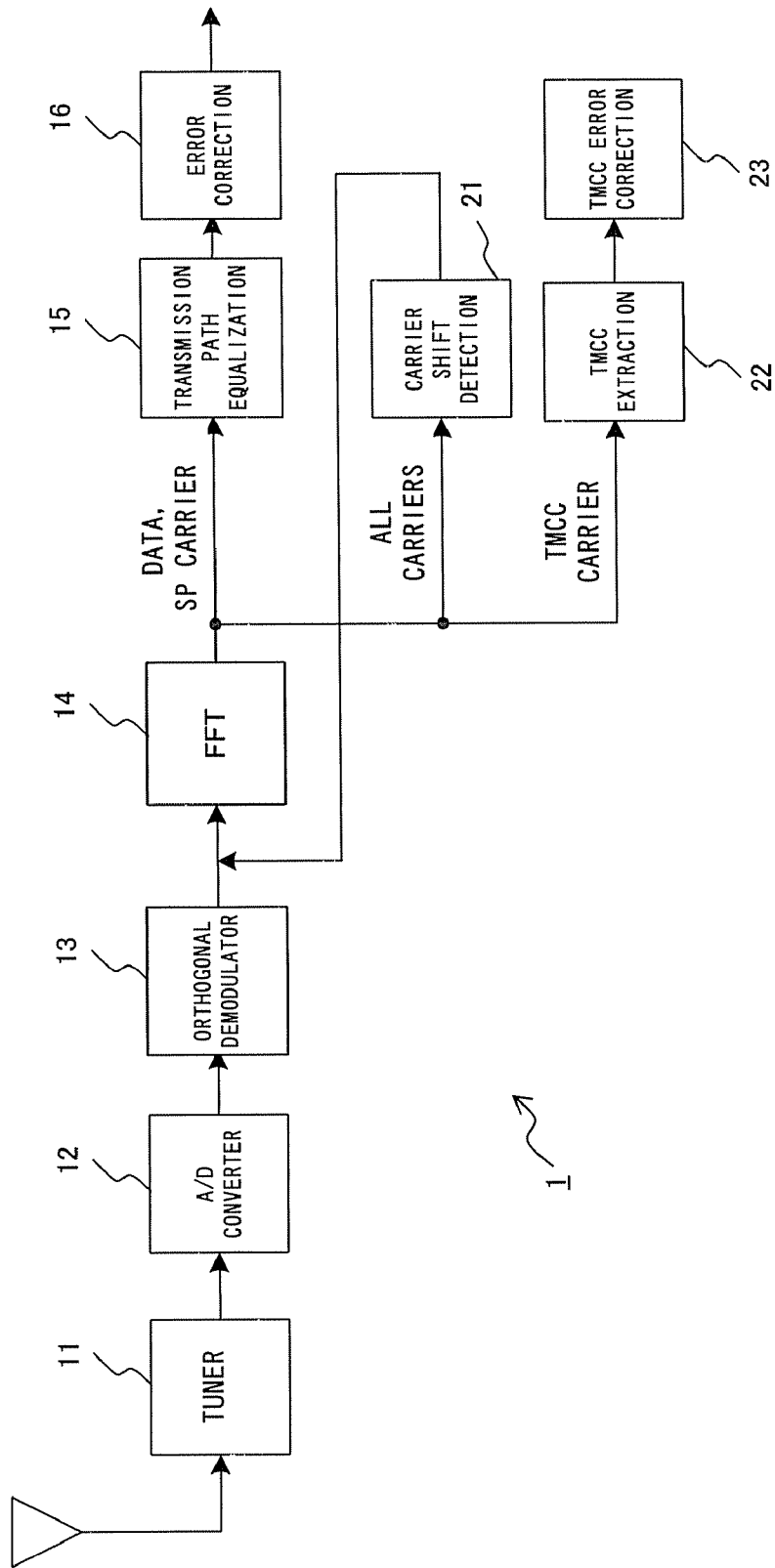
FIG. 3 is a diagram showing the configuration of the digital broadcast receiver relating to the embodiment of the present invention.

FIG. 3 is a diagram showing the configuration of a digital broadcast receiver 1 relating to the embodiments of the present invention. In this description, signals are transmitted by employing OFDM in the digital broadcasts with respect to embodiments of the present invention. With OFDM a plurality of signals can be transmitted in parallel by using a plurality of carriers, each of which have a different frequency. For the digital broadcasts in the embodiments, scattered pilot (SP) signals, auxiliary channel (AC) signals, Transmission and Multiplexing Configuration Control (TMCC) signals, and other signals are transmitted in addition to data signals.

In the digital broadcast receiver 1 shown in FIG. 3, OFDM signals received via an antenna are input to a tuner 11. The tuner 11 selects a signal of the desired channel from the received signals and outputs the selected signal after converting the signal into an intermediate frequency (IF) band. An A/D converter 12 converts the output signal of the tuner 11 into a digital signal. The digital signal is converted into a complex baseband signal by an orthogonal demodulator 13. The complex baseband signal, which is a time-domain signal, is converted into a frequency-domain signal by an FFT circuit 14. As a result, a plurality of signals transmitted using a plurality of carriers having different frequencies from one another can be obtained.

A data carrier transmitting the data signal and an SP carrier transmitting the scattered pilot signal (hereinafter referred to as SP signal) are sent to a transmission path equalization circuit 15. The SP signal is a known signal, having the transmission phase and the transmission power determined in advance, and is used for synchronous detection and transmission path estimation. The transmission path equalization circuit 15 equalizes the data signal using the SP signal and outputs the equalized data signal as demodulated data. In this description, the term "equalization" includes processing for correcting phase rotation that has occurred on the transmission path. The demodulated data is converted into binary data with one bit or a plurality of bits by demapping processing and is output in a Transform Stream (TS) after correction processing by an error correction circuit 16.

All frequency-domain signals (hereinafter referred to as carrier signals) obtained by the FFT circuit 14 are fed to a carrier shift detection circuit 21. The carrier shift detection circuit 21 detects the phase information of each carrier signal and recognizes each of the carrier signals by their phase information. At that time, if any carrier shift occurs, the signals to be input into the FFT circuit 14 are corrected.

A TMCC signal contained in a plurality of carrier signals obtained by the FFT circuit 14 is fed to a TMCC extraction circuit 22. The TMCC extraction circuit 22 extracts TMCC data. The TMCC data is explained later in detail. A TMCC error correction circuit 23 performs error correction by using an error correction parity bit added to the TMCC data. Note that TMCC contains control information for transmitting data.

Figure 4:
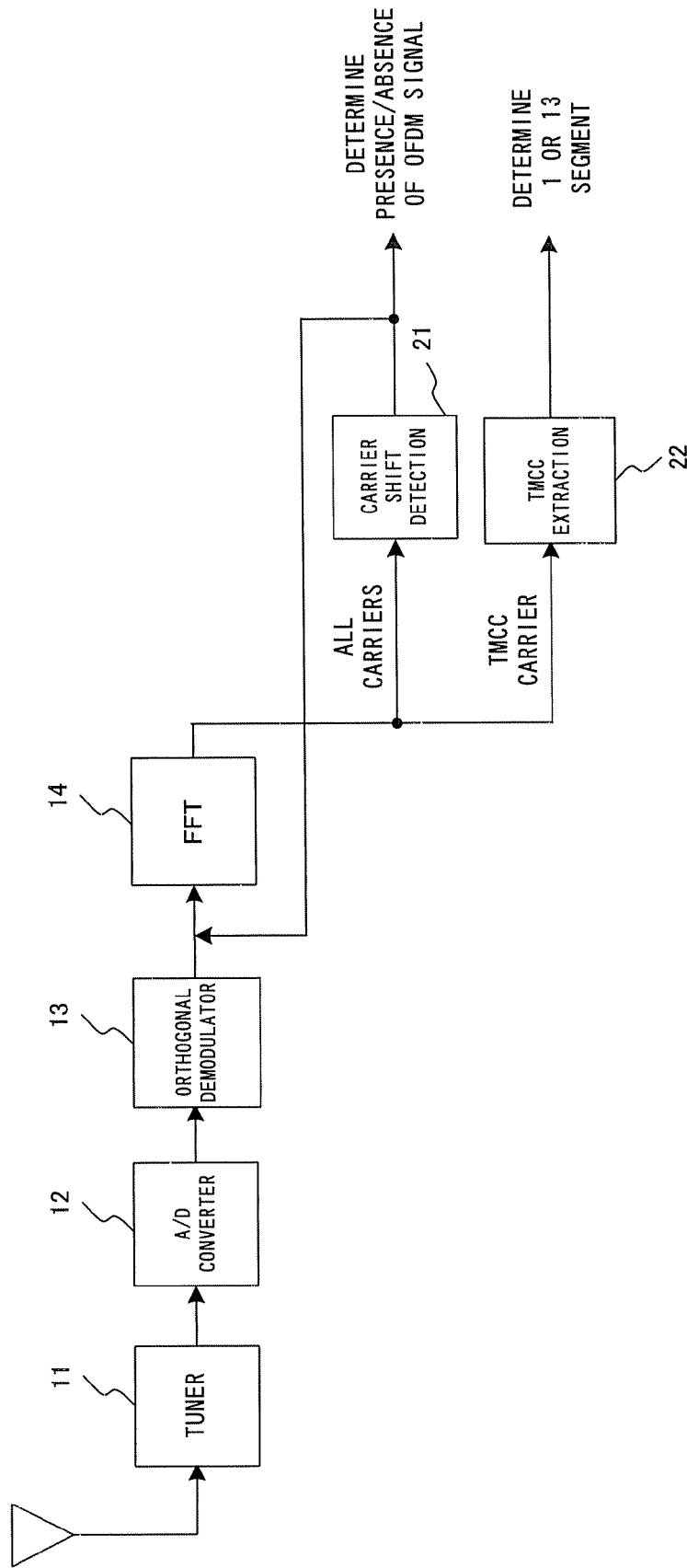
FIG. 4 is a diagram giving an overview of a channel search operation of the embodiment.

FIG. 4 is a diagram giving an overview of the channel search operation of the embodiment. In this description, channel search is a function for detecting either a channel that is currently providing a digital broadcast or a channel that is currently available for digital broadcasting from among the channels in the digital broadcasting system (ISDB-T in Japan provides 13 ch-62 ch in the UHF band for digital TV broadcasting).

The channel search function of the embodiment is realized mainly by the carrier shift detection circuit 21 and the TMCC extraction circuit 22. The carrier shift detection circuit 21 and the TMCC extraction circuit 22 check whether an OFDM signal is present or absent (and whether the OFDM signal can be received or not) for each channel. In other words, the carrier shift detection circuit 21 determines whether an OFDM signal is present or absent by using the phase information of each carrier signal. The TMCC extraction circuit 22 determines whether or not an OFDM signal can be received on the basis of the extracted TMCC data. For example, if the digital broadcast receiver 1 of the embodiment is a mobile terminal and the mobile terminal comprises a function for receiving 1-segment/3-segment broadcasts alone, 13-segment broadcasts cannot be received by the receiver.

It should be noted that the basic operations of the carrier shift detection circuit 21 and the TMCC extraction circuit 22 are publicly known technologies. However, the carrier shift detection circuit 21 and the TMCC extraction circuit 22 have a channel search function.

Figure 5:
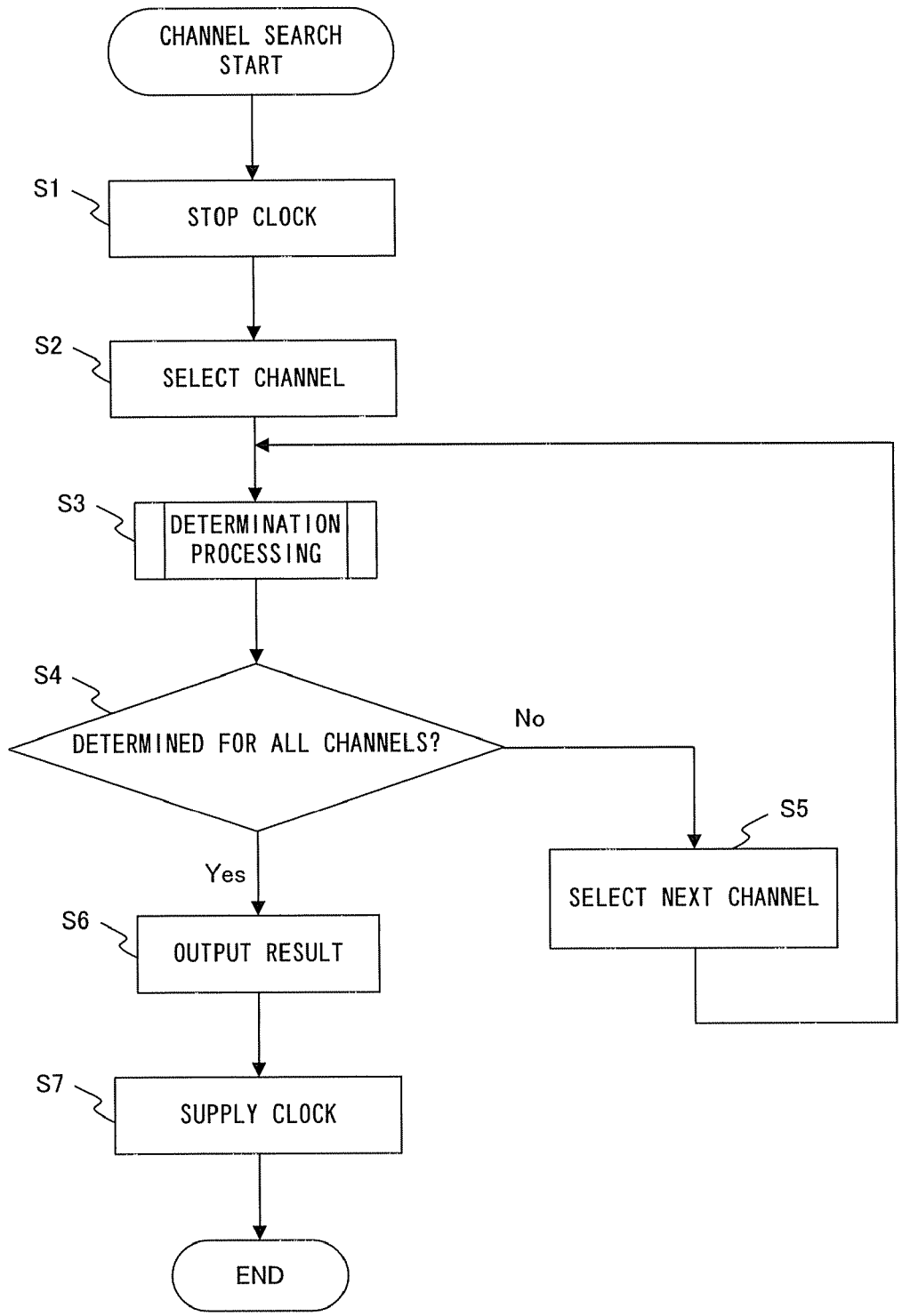
FIG. 5 is a flowchart showing the channel search operation of the embodiment.

FIG. 5 is a flowchart showing the channel search operation of the embodiment. The processing in the flowchart is executed, for example, when an instruction to perform a channel search is input by a user of the digital broadcast receiver 1. Alternately, the processing may be automatically executed upon power activation of the digital broadcast receiver 1.

In step S1, the supply of clock signals to the transmission path equalization circuit 15 and the error correction circuit 16 is stopped. In the digital broadcast receiver 1, clock signals are sent to the transmission path equalization circuit 15 and the error correction circuit 16 via gate circuits such as AND elements. In such a case, the supply of clock signals can be stopped by providing a control signal to the gate circuits. The transmission path equalization circuit 15 and the error correction circuit 16 stop the operations while the clock signals are not supplied.

In step S2, a channel (search target channel) is selected in which it is to be determined whether or not the digital signal is being broadcast. Note that the selection of a channel is performed by the tuner 11. In step S3, determination processing is performed. The determination processing is explained later in detail. In step S4, whether the determination processing is finished for all channels is checked. If there are any channels remaining unprocessed, the next channel is selected in step S5 and the operation returns to step S3. If the determination processing is finished for all channels, the result of the channel search is output in step S6. The result of the channel search is displayed, for example, on a display device. In step S7, the supply of the clock signals to the transmission path equalization circuit 15 and the error correction circuit 16 is resumed.

As described above, according to the channel search method of the embodiments, it is possible to stop the operations of circuit elements that are not related to the channel search operation during the execution of the channel search operation. Consequently, power consumption can be reduced.

Next, determination processing executed for each channel is explained in detail. Note that the determination processing explained below corresponds to step S3 of the flowchart shown in FIG. 5.

Figure 6:
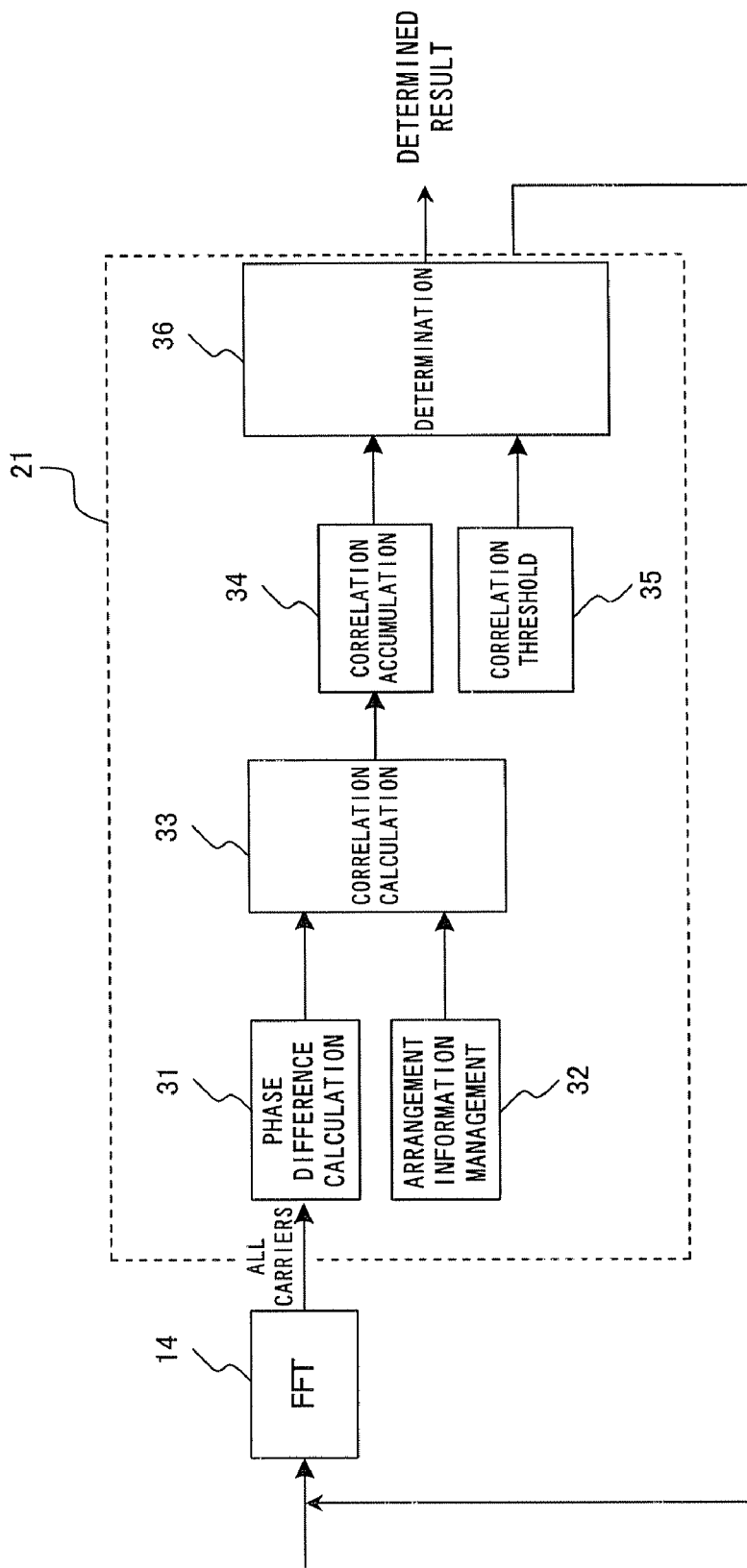
FIG. 6 is a diagram showing a configuration of the carrier shift detection circuit.

FIG. 6 is a diagram showing a configuration of the carrier shift detection circuit 21. Note that in the drawing, circuit elements not directly related to the channel search operation are omitted. That is, the channel search method of the embodiments utilizes a function for calculating the correlation of phase information among functions provided by the carrier shift detection circuit 21 and does not utilize any functions for detecting the presence/absence of carrier shift or any functions for detecting the amount of carrier shift. Therefore, no functions for correcting the signals input to the FFT circuit 14 in accordance with the amount of carrier shift are included in FIG. 6.

A phase difference calculation unit 31 calculates the phase difference between symbols one after another for each carrier signal and stores the difference information in the phase information memory shown in FIG. 7. "Phase difference between symbols" denotes the difference between the phase assigned to a particular symbol and the phase assigned to the subsequent symbol. In the record of "symbol k (k=1, 2, 3 ...)" in FIG. 7 the phase difference information between the symbol k-1 and the symbol k is stored. A carrier number is information identifying each carrier that constitutes an OFDM signal in a digital broadcast. However, whether the OFDM signal is present or absent in the search target channel is not known at the initial time of a channel search. Even if an OFDM signal is present in the search target channel, the signals (data signals, AC signals, or TMCC signals) to which a plurality of frequency-domain signals obtained from the FFT circuit 14 correspond are not known. In other words, it is probable that carrier shift occurs. Therefore, the carrier number of the phase information stored in the memory shown in FIG. 7 is a hypothetical identification number.

The AC data and the TMCC data are transmitted after being modulated by DBPSK. That is, both the AC carrier and the TMCC carrier transmit a DBPSK modulated signal. Therefore, the phase difference between symbols obtained on the basis of the AC carrier and the TMCC carrier is always "zero" or "$\pi$". Meanwhile, the data (including SP in this description) is transmitted after being modulated by DQPSK, QPSK, 16QAM, or 64QAM. Therefore, the phase difference between symbols obtained on the basis of the data carrier can take various values (including but not limited to "zero", "$\pi/2$", "$\pi$", and "$3\pi/2$").

An arrangement information management unit 32 manages the arrangement of the AC carrier and the TMCC carrier. Here, both AC and TMCC are assigned to a carrier of a predetermined frequency. For example, in mode 2 and mode 3 of digital terrestrial broadcasting in Japan (ISDB-T), the carriers are determined as shown in FIG. 8.

A correlation calculation unit 33 calculates the correlation between the phase difference $\theta_i$ (i=1-432) obtained by the phase difference calculation unit 31 and a predetermined reference phase $\theta_{ref}$. Here, "correlation" denotes the difference between the phase difference $\theta_i$ and the reference phase $\theta_{ref}$. In addition, a state such that the difference between the phase difference $\theta_i$ and the reference phase $\theta_{ref}$ is small is defined as "high correlation". Note that the reference phase $\theta_{ref}$ is "zero" or "$\pi$" in the present embodiments.

The correlation calculation unit 33, under the assumption that an OFDM signal is contained in the search target channel, calculates the correlation between the phase difference $\theta_i$ of the carrier estimated to be the AC carrier and the TMCC carrier and the reference phase $\theta_{ref}$. Suppose that the digital broadcasts of mode 3 is adopted in this description. Then, each of the correlations between the reference phase $\theta_{ref}$ and 12 phase differences ($\theta_7$, $\theta_{89}$, $\theta_{101}$, $\theta_{131}$, $\theta_{206}$, $\theta_{209}$, $\theta_{226}$, $\theta_{244}$, $\theta_{286}$, $\theta_{349}$, $\theta_{377}$, and $\theta_{407}$) obtained from 12 carriers (carrier number="7", "89", "101", "131", "206", "209", "226", "244", "286", "349", "377", "407") are calculated. The correlation calculation unit 33 calculates the sum of the 12 correlation values, which is called the added correlation value.

Here, since the AC carrier and the TMCC carrier transmit the DBPSK demodulated signal, the phase difference $\theta_i$ obtained on basis of the AC carrier and the TMCC carrier is always "zero" or "$\pi$". The reference phase $\theta_{ref}$ is "zero" or "$\pi$". Therefore, if an OFDM signal is contained in the search target channel, all of the 12 correlation values are large values, and the added correlation value becomes large.

On the other hand, if an OFDM signal is not contained in the search target channel, the phase difference $\theta_i$ obtained by the phase difference calculation unit 31 could take a value other than "zero" or "$\pi$". In this case, at least some of the 12 correlations could become small and the added correlation value would be small as a result. Consequently, by evaluating the added correlation value, it is possible to determine whether an OFDM signal is present or absent in the search target channel.

However, as described above, the signals (data signals, the AC signals, or the TMCC signals) to which a plurality of the frequency-domain signals obtained from the FFT circuit 14 correspond are not known. That is, it is probable that carrier shift is occurring in this situation. Therefore, the correlation calculation unit 33 calculates each added correlation value by sweeping the 12 carriers for which the correlation has to be calculated. Specifically, while incrementing or decrementing a sweep variable k (k=±1, ±2, ±3 . . . ), the added correlation value obtained from each of the 12 carriers (carrier number="7+k", "89+k", "101+k", "131+k", "206+k", "209+k", "226+k", "244+k", "286+k", "349+k", "377+k", "407+k") is calculated. Then the correlation calculation unit 33 outputs the largest added correlation value (maximum correlation value).

The correlation calculation unit 33 outputs the maximum correlation value of each symbol (100 symbols in the example in FIG. 7). A correlation accumulation unit 34 calculates a determinant correlation value by cumulatively adding the maximum correlation values output from the correlation calculation unit 33.

A determination unit 36 compares the determinant correlation value obtained from the correlation accumulation unit 34 with a correlation threshold stored in a threshold storing unit 35. If the determinant correlation value is larger than the correlation threshold, it is determined that an OFDM signal is contained in the search target channel. If the determinant correlation value is smaller than the correlation threshold, it is determined that an OFDM signal is not contained in the search target channel.

As described above, in the channel search method of the embodiments the determination of whether an OFDM signal is present in the search target channel is based on the correlation between the phase information of a plurality of carrier signals and prescribed phase information prepared in advance. Therefore, by employing this method for determining whether the OFDM signal is present or absent for each channel, channel search function can be realized. Since this procedure can be conducted before the establishment of frame synchronization, the channel search requires only a short time period.

Note that according to the present invention, the correlation accumulation unit 34 is not a required element. However, the accuracy of the channel search can be improved by including the correlation accumulation unit 34.

In the above embodiments, additionally, the entirety of the AC carrier signal and the TMCC carrier signal are used; however, the correlation can be calculated by using only a part of the AC carrier signal and the TMCC carrier signal or by using either one of the AC carrier signal or the TMCC carrier signal, and based on the correlation, the determination of whether the OFDM signal is present or absent may be made.

In the determination processing using the carrier shift detection circuit 21, it is possible to detect whether an OFDM signal is present or absent in the search target channel. However, in a receiver that cannot receive all of the broadcasting methods, the determination of whether the OFDM signal is present or absent is not sufficient. For example, if 13-segment broadcasting exists in a channel, the OFDM signal can be detected by executing the above method. That is, it is possible to detect that the channel broadcasts digital signals. However, the digital broadcast receiver, which only receives 1-segment/ 3-segment broadcasts, cannot receive 13-segment broadcasts. Therefore, the channel search method of the embodiments comprises a function for detecting the broadcasting method by using TMCC.

FIGS. 9A and 9B are diagrams showing the format of the TMCC data. The frame length of the TMCC data is 204 bits. Here, "system identification information ($20^{th}$-$21^{st}$ bit)" identifies a broadcast as either digital terrestrial TV broadcasts or terrestrial audio broadcasts. A "partial reception flag ($27^{th}$ bit)" identifies "partial reception enable (1)" or "partial reception disable (0)". "Partial reception enable" indicates that one channel provides both a 12-segment broadcast and a 1-segment broadcast of a digital TV broadcast. On the other hand, "partial reception disable" indicates that one channel provides only a 13-segment broadcast. Therefore, in the digital broadcast receiver, which is only able to receive 1-segment/ 3-segment broadcasts, if a channel has the "system identification information=00 (digital terrestrial TV broadcasts)" and "partial reception flag=0 (disable)", it is determined that the channel cannot be received.

FIG. 10 is a flowchart showing implementation of the channel search method. The processing of the flowchart corresponds to step S3 shown in FIG. 5, and the processing is executed for each channel.

Instep S11, whether the correlation relating to the phase information is larger than a threshold is determined. The determination process is the same as explained with reference to FIGS. 6-8. If the correlation is larger than the threshold, it is determined that the OFDM signal is present in the search target channel and the operation proceeds to step S12. If the correlation is smaller than the threshold, on the other hand, it is determined that the OFDM signal is not present in the search target channel.

In step S12, whether the receiver can receive 13-segment broadcasts is checked. Note that information representing whether 13-segment broadcasts can be received is preset in each of the digital broadcasting receiver apparatuses. In general, mobile terminals cannot receive 13-segment broadcasts. If the receiver cannot receive 13-segment broadcasts, the operation proceeds to step S13.

In step S13, whether frame synchronization is established within a prescribed time period is checked. The establishment of frame synchronization is determined when a "synchronization signal ($1^{st}$-$16^{th}$ bit)" of the TMCC data is detected. When frame synchronization is established within the prescribed time period, the operation proceeds to step S14. On the other hand, if frame synchronization is not established within the prescribed time period, it is determined that the digital broadcast of the search target channel cannot be received.

In step S14, the TMCC data is analyzed, and whether the digital broadcast of the search target channel can be received or not is checked. Here, assume that 1-segment broadcasting/ 3-segment broadcasting can be received.

In step S15, the same processing as that in step S11 is executed once again. At that time, the processing in step S15 is executed in parallel with steps S13-S14.

In step S16, in accordance with the result of steps S13-S15, whether the receivable digital broadcast is being broadcast or not is determined. Specifically, when the frame synchronization is established, when the received signal is a 1-segment/3-segment broadcast and when the correlation is larger than the threshold, it is determined that the digital broadcast is receivable.

Next, the time required for a channel search operation of the embodiments is examined. In this description, assume that the 1-symbol time is 1 ms. Additionally, since the TMCC data is modulated by the DBPSK modulation, the time required for receiving each bit of the TMCC data is 1 ms.

The processing time for step S11 depends on the requested accuracy of the channel search. In other words, in order to improve the channel search accuracy, the amount of phase information used for correlation calculation needs to be increased. For example, in order to collect the phase information for 100 symbols, approximately 100 ms is required. However, it is conceivable that when using the phase information of more than several hundred symbols, the accuracy of the channel search stays nearly constant. Consequently, the processing time of step S11 can be estimated to be less than 0.5 seconds in this example. It should be noted that the processing time of step S12 is significantly shorter than the processing time of step S11.

The processing time of step S13 can be estimated to be 0.2-0.4 seconds, since the TMCC data has 204 symbols. The processing of step S14 uses the $20^{th}$, $21^{st}$, and $27^{th}$ bit of the TMCC data. At that time, the frame synchronization is established using the $1^{st}$-$16^{th}$ bit synchronization signal. That is, after establishing the frame synchronization, the time required for the processing of step S14 is the same as that required for 12 symbols (12 ms). Note that because the processing of step S15 is executed in parallel with steps S13-S14, the processing does not influence the time required for channel searching.

As explained above, the processing time per channel is approximately 0.7-0.9 seconds in the channel search method of the embodiments. However, in channels where an OFDM signal is absent, the processing after step S12 is not executed and therefore the processing time per channel can be reduced to less than 0.5 seconds. Consequently, the time required for searching in all channels is greatly reduced from that of the conventional method.

It should be noted that in the method of the embodiment, error correction processing of the TMCC data might not be performed. In order to perform the error correction processing of the TMCC data, one frame of the TMCC data needs to be accumulated, which requires more than 200 seconds. Therefore, in the method of the embodiments, the search time period can be reduced by not performing the error correction processing. If error correction is not performed, the reliability of the TMCC data is lowered. However, if the reception environment is deteriorated so that errors occur in the TMCC data, the correlation of the phase information probably will be smaller than the threshold in step S11, and step S14 will not be performed. Consequently, in the channel search operation of the embodiments, there is no problem even if the error correction of TMCC is omitted.

The method of the embodiments makes a determination on the basis of the correlation of the phase information by using the time required for the frame synchronization and the TMCC analysis. Therefore, the accuracy can be improved without increasing the channel search time.

Additionally, steps S12-S16 of the flowchart shown in FIG. 10 are processing steps for improving the search accuracy and are not essential in the present invention. Thus, whether steps S12-S16 are to be executed or not should be appropriately determined with consideration for the search time and search accuracy.

What is claimed is:

1. A digital broadcast receiver for receiving digital broadcasts using OFDM, comprising:
   a Fourier transformation circuit to perform Fourier transformation of a received signal to obtain a plurality of carrier signals including a plurality of DBPSK carrier signals respectively carrying a DBPSK signal;
   a phase difference calculation unit to detect a phase difference between adjacent symbols in each of the plurality of carrier signals;
   a correlation calculation unit to calculate a correlation value representing the correlation between the phase difference detected by the phase difference calculation unit and zero or $\pi$; and
   a determination unit to determine whether an OFDM signal is present, wherein
   the plurality of DBPSK carrier signals are allocated in a predetermined allocation pattern,
   the phase difference calculation unit sequentially detects the phase differences for a plurality of carrier signals in the allocation pattern while sweeping frequency,
   the correlation calculation unit respectively calculates sums of the correlation values for the plurality of carrier signals in the allocation pattern in the sweeping, and detects a maximum sum of the correlation values,
   the determination unit determines that the OFDM signal is present if the maximum sum of the correlation values is larger than a predetermined threshold.

2. The digital broadcast receiver according to claim 1, wherein
   the OFDM signal of the digital broadcast comprises a data carrier signal, an AC carrier signal, and a TMCC carrier signal, and
   the DBPSK carrier signal is the AC carrier signal or the TMCC carrier signal.

3. The digital broadcast receiver according to claim 1, wherein
   the correlation calculation unit cumulatively adds the correlation value for a certain time period, and
   the determination unit determines that the OFDM signal is present if the cumulatively added correlation value is larger than a threshold.

4. The digital broadcast receiver according to claim 1, further comprising:
   an equalization circuit to equalize the data carrier signal comprised in the OFDM signal of digital broadcast; and
   an error correction circuit to perform error correction of an output signal of the equalization circuit.

5. A mobile terminal for receiving 1-segment and 3-segment digital broadcasts using OFDM, comprising:
   a Fourier transformation circuit for performing Fourier transformation of a received signal;
   a phase difference calculation unit for detecting the phase information of a plurality of carrier signals obtained by said Fourier transformation circuit;
   a correlation calculation unit for calculating a correlation value representing the correlation between the phase information detected by said phase difference calculation unit and prescribed phase information prepared in advance;

a TMCC extraction circuit for detecting whether or not the received signal is a 13-segment broadcast signal on the basis of TMCC data comprised in the received signal; and a determination unit for determining that an OFDM signal can be received if the correlation value obtained by said correlation calculation unit is larger than a predetermined threshold and that the received signal is not a 13-segment broadcast signal.

6. The mobile terminal according to claim 5, wherein said correlation calculation unit recalculates the correlation value in parallel with the processing of said TMCC extraction circuit to analyze TMCC data, and said determination unit determines that the OFDM signal can be received only when the correlation value is larger than the threshold in the recalculation.

7. A channel search method in a digital broadcast receiver for receiving digital broadcast using OFDM, comprising:

performing the Fourier transformation of a received signal by using a Fourier transformation circuit to obtain a plurality of carrier signals including a plurality of DBPSK carrier signals respectively carrying a DBPSK signal;

detecting a phase difference between adjacent symbols in each of the plurality of carrier signals;

calculating a correlation value representing the correlation between the detected phase difference and zero or $\pi$; and determining whether an OFDM signal is present, wherein the plurality of DBPSK carrier signals are allocated in a predetermined allocation pattern, the phase differences for a plurality of carrier signals in the allocation pattern is detected while sweeping frequency, sums of the correlation values for the plurality of carrier signals in the allocation pattern are respectively calculated in the sweeping, and a maximum sum of the correlation values is detected, it is determined that the OFDM signal is present if the maximum sum of the correlation values is larger than a predetermined threshold.

* * * * *